UNITED STATES PATENT OFFICE.

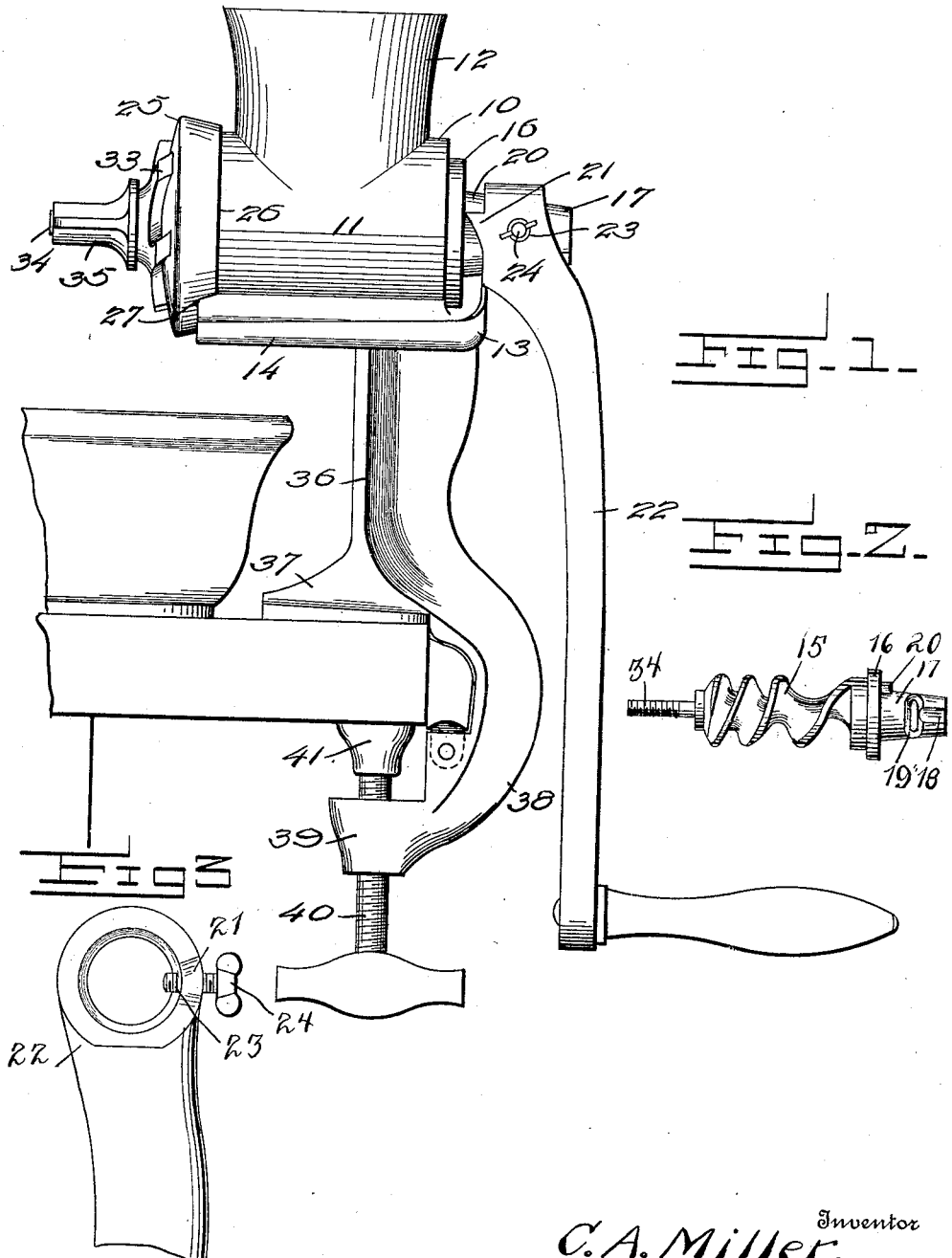

CARROLL A. MILLER, OF ROWLEY, MASSACHUSETTS.

FASTENING DEVICE.

1,104,690.  Specification of Letters Patent.  Patented July 21, 1914.

Application filed June 20, 1911. Serial No. 634,202.

*To all whom it may concern:*

Be it known that I, CARROLL A. MILLER, a citizen of the United States, residing at Rowley, in the county of Essex and State of Massachusetts, have invented certain new and useful Improvements in Fastening Devices, of which the following is a specification.

This invention relates to improvements in meat and vegetable cutters.

Further objects reside in novel means for attaching the crank to the shaft, the stationary cutter to the pressure screw, and the details of construction whereby the device may be readily taken apart to be cleaned.

In the drawings: Figure 1 is a side elevation of the device clamped to a table having a squared edge, Fig. 2 is a detailed view of the pressure screw, Fig. 3 is a fragmentary front elevation of the crank.

Referring particularly to the drawings, 10 represents the casing of the cutter, which has a lower horizontally arranged cylindrical portion 11, and a vertically arranged cylindrical hopper 12. The parts 11, and 12 are cast of one piece, and the hopper 12 opens into the portion 11. Formed integrally with the portion 11 and extending transversely across one end and below the opening thereof is a trough 13, one end extending upwardly on one side of the opening, while its opposite end connects with a straight trough 14 formed longitudinally on the outside of the cylinder 11. The straight trough 14 terminates at a point adjacent the discharge end of the device. By means of this trough, the juices which are forced toward the rear end of the cylinder 11, will escape and be delivered to the receptacle which is placed to receive the cut material. Extending through the cylinder 11 is a pressure screw 15 which has a large spiral thread the forward end having an extra thread between the turns of the larger thread to make a thread of smaller pitch. The rear end of the screw has a stop flange 16 which engages with the end of the cylinder 11 to prevent longitudinal movement therethrough in one direction. Extending outwardly from the stop flange, and centrally thereof is a stub shaft 17, near the outer end of which is formed a longitudinal groove 18, and a circumferentially arranged segmental groove 19, the latter being slightly greater in depth than the former, and crossing its inner end. Secured to the flange or collar 16, is a lug 20 which is adapted to be engaged by a projection 21 formed on the crank 22. Formed through this projection, and through the attachment portion of the handle, is an opening 23, which is threaded to receive the set screw 24, which when the handle is being applied to the stub shaft 17, will engage in the groove 18 to guide the point of said screw into the groove 19, which by reason of its greater depth than the groove 18, when the screw is subsequently tightened, prevents the handle coming off. The engagement of the projection 21 with the lug 20 assists the crank in turning the worm 15, and takes a portion of the strain from the set screw 24.

Detachably secured over the opposite end of the cylinder 11 is a cap 25 having the flange 26 for embracing said member 11, and the notch 27 for engagement with a portion of the end of the trough 14. The adjacent end of the screw projects from the member 11, as at 34, and is adapted to receive the rotary knife 33. It will of course be understood that I use knives of different designs according to the degrees of coarseness or fineness it is desired to cut the material one knife only being shown for convenience. A clamping nut 35 engages the back of the knife 33, and holds the same in positive engagement with the outer face of the cap 25.

Extending below the cylindrical portion 11 is a standard 36 which has formed near its lower end the feet 37 and which form the upper engaging members of the clamp for attaching the device to a table. Below the feet 37 is a bowed portion 38, having at its lower end a threaded apertured lug 39 positioned directly below the space between the feet 37. This lug carries an adjusting screw 40 having on its upper end a bearing head 41. This clamp is provided so that the device may be readily attached to the edge of a table.

What is claimed is:

The combination with a shaft, of a handle on one end of the shaft, the end of the shaft having a longitudinally arranged groove and a circumferentially arranged segmental groove intersecting the first groove, a set screw in the handle, said set screw arranged to be guided into the segmental groove by means of the longitudinal groove, said segmental groove being of greater depth than the longitudinal groove, the grooved end of the shaft having a stop-lug, and the handle having a shoulder for engagement with said lug, whereby the handle is retained on the end of the shaft.

In testimony whereof I affix my signature, in the presence of two witnesses.

CARROLL A. MILLER.

Witnesses:
ELLEN F. JACKSON,
WESLEY G. SMITH.

Copies of this patent may be obtained for five cents each, by addressing the "Commissioner of Patents, Washington, D. C."